United States Patent Office 3,287,212
Patented Nov. 22, 1966

3,287,212
METHOD OF REPELLING CHEWING INSECT LARVAE
Jack D. Early, Bethesda, Md., assignor to Monsanto Company, St. Louis, Mo., a corporation of Delaware
No Drawing. Filed June 14, 1965, Ser. No. 463,854
4 Claims. (Cl. 167—30)

This invention relates to a new and useful repellant (sometimes termed anti-feeding agent) for combatting chewing insect larvae of the order Lepidoptera, especially of the family Noctuidae, employing 3,4-dichloro-N-methyl-N-nitrosoaniline.

The chewing insect larvae repellant (or anti-feeding agent) of this invention structurally is

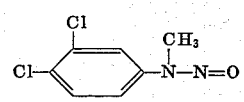

It is a crystalline solid melting at about 47° C. and is prepared by the well known nitrosolation method or reacting a secondary amine (in this case N-methyl-3,4-dichloroaniline) with sodium nitrite in the presence of aqueous mineral acid, e.g. dilute hydrochloric acid. This compound at practical dosages is nontoxic to chewing insect larvae of the order Lepidoptera.

Chewing insect larvae of the order Lepidoptera and especially of the family Noctuidae which includes the larvae of cutworms, bollworms, armyworms, and their allies, are destructive to a wide variety of vegetation, particularly causing considerable damage to the leaves or foliage thereof.

The repellant of this invention is applied to the leaves or foliage of vegetation during its active growth stage, however, it can also be applied during the dormant period. This can be done by spraying the leaves or foliage of the vegetation with an aqueous dispersion containing from 0.001% to 5.0% by weight of the new repellant at a rate sufficient to deposit from one to fifty grams of the new repellant per hundred square feet of leaf or foliage surface. Greater or lesser amounts or concentrations can be used depending upon the particular larvae, the particular type of vegetation, the various spraying techniques, weather conditions, and the like. Ordinarily the dispersion will be applied in an amount sufficient to completely wet the leaves or foliage. While the new repellant can be applied per se to the vegetation, from a practical standpoint and since it is a water-insoluble compound, it is preferably dissolved in a suitable organic solvent, i.e. acetone, to provide a concentrated solution thereof to which concentrate is added based on the weight of the compound from 1% to about 10% by weight of a non-ionic emulsifier such as isooctylphenyl polyethoxyethanol or a fatty acid ester of anhydrosorbitol which has been condensed with ethylene oxide. The presence of such emulsifiers causes the formation of an oil-in-water emulsion when the said concentrate is admixed with water which aqueous dispersion can be applied to the leaves or foliage of the vegetation by typical spraying means such as mechanical ground sprayers, hand sprayers, and the like.

As illustrative of this invention but not limitative thereof is the following:

A 1.0% by weight solution was prepared by dissolving 3,4-dichloro-N-methyl-N-nitrosoaniline in 10 ml. of acetone. To this solution was added based on the weight of the said N-nitrosoaniline 0.02% by weight of the commercial non-ionic emulsifier obtained by condensing ethylene oxide with the mono-higher fatty acid ester of anhydrosorbitol. This mixture was then diluted with three times its weight of water to give an aqueous dispersion containing 0.25% by weight of 3,4-dichloro-N-methyl-N-nitrosoaniline. Three freshly excised whole lima bean leaves were dipped in this aqueous dispersion so as to wet the respective entire surfaces thereof. The so wetted whole leaves were then permitted to dry at room temperature (about 24 hours). On each of the respective surfaces of the dry leaves was then placed ten second instar southern armyworm larvae (*Prodenia eridania*). After 66 hours at room temperature from the time of placement of the ten larvae on the surfaces of the respective dry leaves it was observed that the respective three treated leaves were totally uneaten and all of the larvae were dead. At the intermediary time of 42 hours of the said 66 hour period an average of three larvae per said treated leaf were still alive, whereas in contrast each of the control freshly excised whole lima bean leaves (same procedure as above in triplicate but not treated with the new repellant or new anti-feeding agent) were completely consumed at the end of the same 42 hours, and all of the larvae very much alive.

Dispersions can be provided ready for use in repelling the larvae or they can be provided in a concentrated form suitable for mixing with or dispersing in other extending agents. As illustrative of a particularly useful concentrate is an intimate mixture of insect larvae repellant (or anti-feeding agent) of this invention with a water-soluble surfactant which lowers the surface tension of water in the weight proportions of 0.1 to 15 parts of surfactant with sufficient of the repelling agent of this invention to make 100 parts by weight. Such a concentrate is particularly adapted to be made into a spray for combatting various forms of Lepidoptera larvae by the addition of water thereto. As illustrative of such a concentrate is an intimate mixture of 95 parts by weight of 3,4-dichloro-N-methyl-N-nitrosoaniline and 5 parts by weight of a water-soluble non-ionic surfactant such as the polyoxyethylene derivative or sorbitan monolaurate.

Another useful concentrate adapted to be made into a spray for repelling Lepidoptera larvae is a solution (preferably as concentrated as possible) of the repellant of this invention in an organic solvent therefor. The said liquid concentrate preferably contains dissolved therein a minor amount (e.g. 0.5 to 10 percent by weight of the weight of the new repellant) of a surfactant (or emulsifying agent), which surfactant is also water-soluble. As illustrative of such a concentrate is a solution of 100 parts by weight of 3,4-dichloro-N-methyl-N-nitrosoaniline in acetone which solution contains dissolved therein two parts by weight of a water-soluble polyoxyethylene glycol non-ionic surfactant.

The compound of this invention can also be advantageously employed in combination with known pesticides, including, for example, foliage fungicides, bactericides, and in particular insecticides because the resistance of the insect larvae due to hunger is considerably lessened and they therefore are more susceptible to the toxic qualities of the insecticide at lower concentrations thereof. In this manner it is possible to obtain mixtures which are effective against a wide variety of pests and other forms of noxious life.

While this invention has been described with respect to certain embodiments it is to be understood that it is not so limited and it is to be understood that variations and modifications thereof obvious to those skilled in the art can be made without departing from the spirit or scope of this invention.

What is claimed is:

1. The method of repelling chewing insect larvae of the order Lepidoptera which comprises applying to said larvae 3,4-dichloro-N-methyl-N-nitrosoaniline in an amount sufficient to repel said chewing insect larvae.

2. The method of repelling chewing insect larvae of the family Noctuidae which comprises applying to said larvae 3,4-dichloro-N-methyl-N-nitrosoaniline in an amount sufficient to repel said chewing insect larvae.

3. The method of repelling the chewing insect larvae species *Prodenia eridania* which comprises applying to said larvae 3,4-dichloro-N-methyl-N-nitrosoaniline in an amount sufficient to repel said chewing insect larvae.

4. The method of repelling chewing insect larvae of the order Lepidoptera which comprises spraying said larvae with an aqueous dispersion of 3,4-dichloro-N-methyl-N-nitrosoaniline at a rate sufficient to deposit from one to 50 grams of 3,4-dichloro-N-methyl-N-nitrosoaniline per hundred square feet.

References Cited by the Examiner

UNITED STATES PATENTS

| | | | |
|---|---|---|---|
| 1,871,949 | 8/1932 | Bottrell | 167—13 |
| 1,957,429 | 5/1934 | Adams | 167—13 |
| 2,166,118 | 7/1939 | Bouquet | 167—13 |
| 2,197,624 | 4/1940 | ter Horst | 167—13 |
| 2,274,476 | 2/1942 | Hechenbleikner | 167—13 |

FOREIGN PATENTS 1,071,409  12/1959  Germany.

JULIAN S. LEVITT, *Primary Examiner.*

SAM ROSEN, *Examiner.*

STANLEY J. FRIEDMAN, *Assistant Examiner.*